(12) United States Patent
Araki et al.

(10) Patent No.: US 12,339,168 B2
(45) Date of Patent: Jun. 24, 2025

(54) ANALYSIS DEVICE

(71) Applicant: SHIMADZU CORPORATION, Kyoto (JP)

(72) Inventors: Takahisa Araki, Kyoto (JP); Kota Nagasao, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 145 days.

(21) Appl. No.: 18/278,616

(22) PCT Filed: Dec. 21, 2021

(86) PCT No.: PCT/JP2021/047283
§ 371 (c)(1),
(2) Date: Aug. 23, 2023

(87) PCT Pub. No.: WO2022/196015
PCT Pub. Date: Sep. 22, 2022

(65) Prior Publication Data
US 2024/0151510 A1    May 9, 2024

(30) Foreign Application Priority Data
Mar. 18, 2021    (JP) .................................. 2021-044445

(51) Int. Cl.
*G01J 3/453*    (2006.01)
*G01J 3/06*    (2006.01)
(Continued)

(52) U.S. Cl.
CPC .............. *G01J 3/4535* (2013.01); *G01J 3/06* (2013.01); *G02B 7/1821* (2013.01); *H02K 33/18* (2013.01)

(58) Field of Classification Search
CPC ...... G01J 3/06; G01J 3/4535; G01J 2003/062; G01J 2003/064; G02B 7/1821; H02K 33/18
See application file for complete search history.

(56) References Cited

U.S. PATENT DOCUMENTS 5,883,712 A * 3/1999 Coffin ....................... G01J 3/06
356/452
9,297,639 B2 * 3/2016 Jackson ................ G01J 3/0237
(Continued)

FOREIGN PATENT DOCUMENTS

JP    2016142527    8/2016
JP    2019158348    9/2019
(Continued)

OTHER PUBLICATIONS

"Written Opinion of the International Searching Authority (Form PCT/ISA/237) of PCT/JP2021/047283", mailed on Feb. 22, 2022, with partial English translation thereof, pp. 1-6.
(Continued)

*Primary Examiner* — Michael A Lyons
(74) *Attorney, Agent, or Firm* — JCIPRNET

(57) ABSTRACT

A driving part of an analysis device includes a cylindrical part on one surface of which a moving mirror is fixed, and a VCM connected at another surface of the cylindrical part and reciprocating the cylindrical part. The VCM includes: a yoke in a cylindrical shape; magnets provided at two ends of the yoke; a fixing part which is in a cylindrical shape enclosing the yoke and fixes, at a bottom surface, the yoke provided with the magnets; a lid part provided with windows and covering an opening surface of the fixing part; a moving part which is arranged between the yoke and the fixing part and on which a coil in a cylindrical shape is fixed; and support parts each including one end fixed to the moving
(Continued)

part and another end connected at the another surface of the cylindrical part through the window.

5 Claims, 5 Drawing Sheets

(51) Int. Cl.
    *G02B 7/182*     (2021.01)
    *H02K 33/18*     (2006.01)

(56) References Cited

U.S. PATENT DOCUMENTS

| | | |
|---|---|---|
| 2018/0113026 A1 | 4/2018 | Kamikake |
| 2019/0186993 A1* | 6/2019 | Maruno .................... G01J 3/45 |
| 2019/0277699 A1 | 9/2019 | Yokota |

FOREIGN PATENT DOCUMENTS

| | | |
|---|---|---|
| WO | 2016166872 | 10/2016 |
| WO | 2018020847 | 2/2018 |
| WO | 2018193499 | 10/2018 |

OTHER PUBLICATIONS

"Search Report of Europe Counterpart Application", issued on Jan. 23, 2025, p. 1-p. 8.

* cited by examiner

ANALYSIS DEVICE

CROSS-REFERENCE TO RELATED APPLICATION

This application is a 371 application of the International PCT application serial no. PCT/JP2021/047283, filed on Dec. 21, 2021, which claims the priority benefits of Japan Patent Application No. 2021-044445, filed on Mar. 18, 2021. The entirety of each of the above-mentioned patent applications is hereby incorporated by reference herein and made a part of this specification.

TECHNICAL FIELD

The present invention relates to an analysis device including a driving part that moves a position of a mirror.

RELATED ART

A Michelson two-beam interferometer used in a Fourier transform infrared spectroscope (FTIR) has a configuration in which an infrared light emitted from an infrared light source is divided into two directions by a beam splitter toward a fixed mirror and a moving mirror, and the light reflected from the fixed mirror and the light reflected from the moving mirror are combined again by the beam splitter. In the FTIR, with the moving mirror moved forward and rearward in an incident light axis direction (front-rear direction), a difference in an optical path length of the two divided beams is changed to generate an interference light (International Publication No. 2016/166872: Patent Document 1).

In the FTIR, a voice coil motor (hereinafter also referred to as a VCM) is used as a driving part that moves the position of the moving mirror. The VCM is a driving part that obtains a thrust of a moving part according to an electromagnetic force generated by arranging the moving part provided with a coil in a magnetic field and passing a current through the coil. Further, the VCM is capable of obtaining high-speed control on the moving part in its structure and is excellent in driving such as reciprocating the moving part at a constant speed.

RELATED ART DOCUMENTS

Patent Documents

Patent Document 1: International Publication No. 2016/166872

SUMMARY OF INVENTION

Problems to be Solved by Invention

However, in the case where a magnetic flux density of the magnetic field in which the moving part provided with the coil is arranged is not uniform, the thrust of the moving part varies depending on the position of the moving part. In particular, at positions where the magnetic flux density is weak, there is a problem that the thrust of the moving part is insufficient and the moving part cannot be reciprocated at a constant speed. In the FTIR, the moving mirror is fixed to the moving part and reciprocated, but in the case where the VCM cannot reciprocate the moving part at a constant speed, there is a problem of decreased reproducibility of measurement data. Furthermore, to improve the resolution of the FTIR, it is necessary to reciprocate the moving mirror in a wider range, and it is desired to make the magnetic flux density uniform in a wider range in the VCM.

To make the magnetic flux density uniform in a wider range in the VCM, it is conceivable to increase a length of a yoke. However, with the length of the yoke increased, there is a problem that the magnetic flux density decreases over the entire stroke, and the thrust of the moving part is reduced over the entire stroke. Further, while it is also possible to provide a magnet having a strong magnetic force to compensate for the decrease in the magnetic flux density resulting from the increased length of the yoke, there is a problem that the driving part itself becomes large in size due to the arrangement of the strong magnet.

The present invention has been made to solve the above problems, and an objective thereof is to provide an analysis device including a driving part capable of reciprocating a moving part at a constant speed in a wider stroke range without an increase in size.

Means for Solving Problems

An analysis device according to an aspect of the present invention includes a moving mirror and a driving part. A position of the moving mirror is movable. The driving part moves the position of the moving mirror. The driving part includes a cylindrical part and a voice coil motor. The moving mirror is fixed on one surface of the cylindrical part. The voice coil motor is connected at another surface of the cylindrical part and reciprocates the cylindrical part. The voice coil motor includes a yoke in a cylindrical shape, magnets provided at two ends of the yoke, a fixing part, a lid part, a moving part, and a plurality of support parts. The fixing part is in a cylindrical shape enclosing the yoke and fixes, at a bottom surface, the yoke provided with the magnets. The lid part is provided with a plurality of windows and covers an opening surface of the fixing part. The moving part is arranged between the yoke and the fixing part, and a coil in a cylindrical shape is fixed on the moving part. The plurality of support parts each include one end fixed to the moving part and another end connected at the another surface of the cylindrical part through the window.

Effects of Invention

According to the driving part described above, since the lid part is provided at the opening surface of the fixing part, and the cylindrical part on which the mirror is fixed is supported by the support parts provided through the windows of the lid part, the moving part can be reciprocated in a wider range without an increase in size. Further, in the analysis device described above, since the mirror can be reciprocated in a wider range, it is possible to achieve measurements with high resolution.

DESCRIPTION OF EMBODIMENTS

Figure 1:
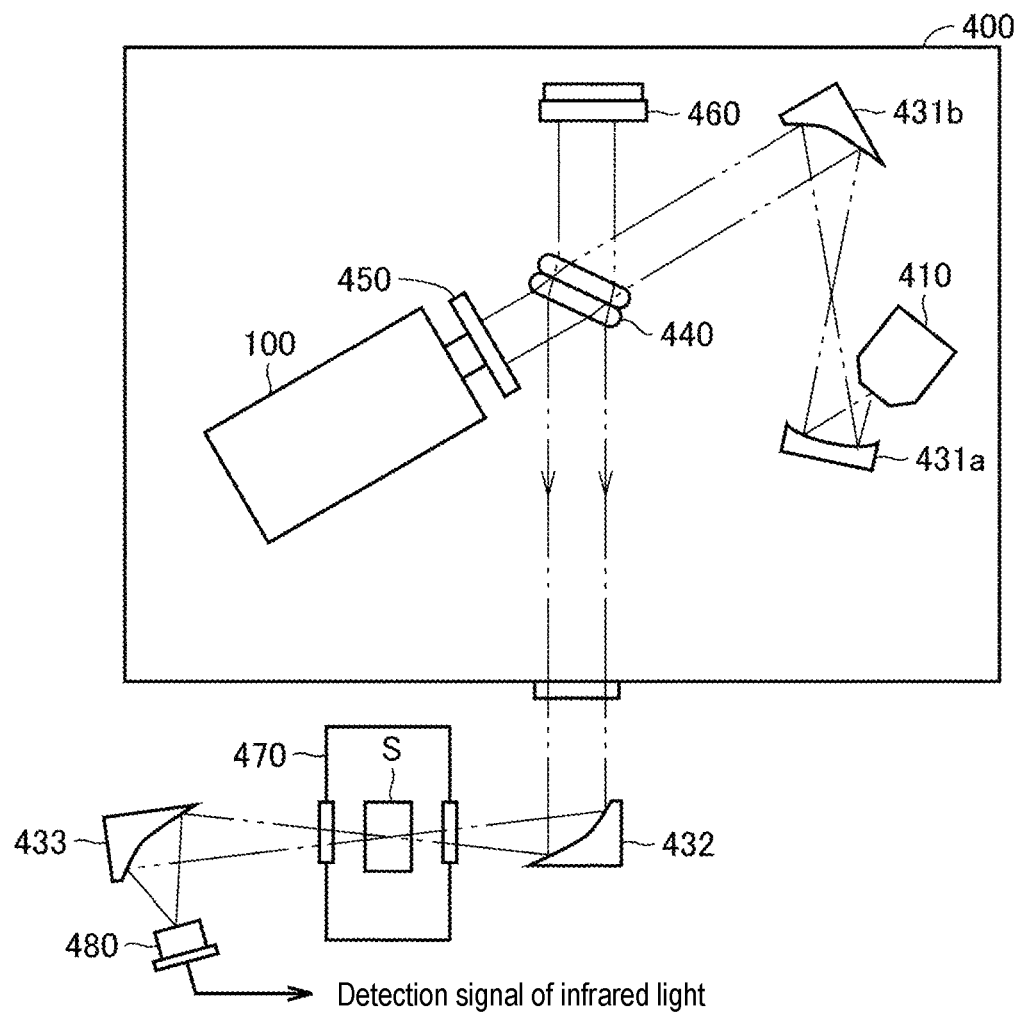
FIG. 1 is a block diagram showing a configuration of an analysis device according to an embodiment.

Hereinafter, embodiments of the present invention will be described in detail with reference to the drawings. In the drawings, the same or equivalent parts will be labeled with the same reference signs, and descriptions thereof will not be repeated.

[Configuration of Analysis Device]

FIG. 1 is a block diagram showing a configuration of an analysis device according to an embodiment. In this embodiment, an FTIR is described and illustrated as an example of the analysis device. The analysis device of the embodiment is not limited to the FTIR, but may be similarly applied to any analysis device including a device that moves a position of a mirror and creates an optical path length difference, for example, in nonlinear Raman spectroscopy.

The FTIR shown in FIG. 1 includes a main interferometer composed of an infrared light source 410, a condenser mirror 431a, a collimator mirror 431b, a beam splitter 440, a moving mirror 450, and a fixed mirror 460, all accommodated in an interferometer chamber 400. A driving part 100 is connected to the moving mirror 450, and the driving part 100 moves the position of the moving mirror 450. In the main interferometer, an infrared light emitted from the infrared light source 410 is split into two portions by the beam splitter 440 after passing by the condenser mirror 431a and the collimator mirror 431b. One portion is reflected by the fixed mirror 460, the other portion is reflected by the moving mirror 450, and the two portions are combined again at the same optical path to form an infrared interference light.

The infrared interference light is condensed by a parabolic mirror 432 and enters a sample chamber 470, and upon irradiation onto a sample S, it undergoes absorption at a wavelength specific to the sample S. The infrared interference light that has undergone absorption passes by an ellipsoidal mirror 433, is detected by an infrared light detector 480, and is Fourier transformed to generate a power spectrum.

[Configuration of Driving Part]

Figure 2:
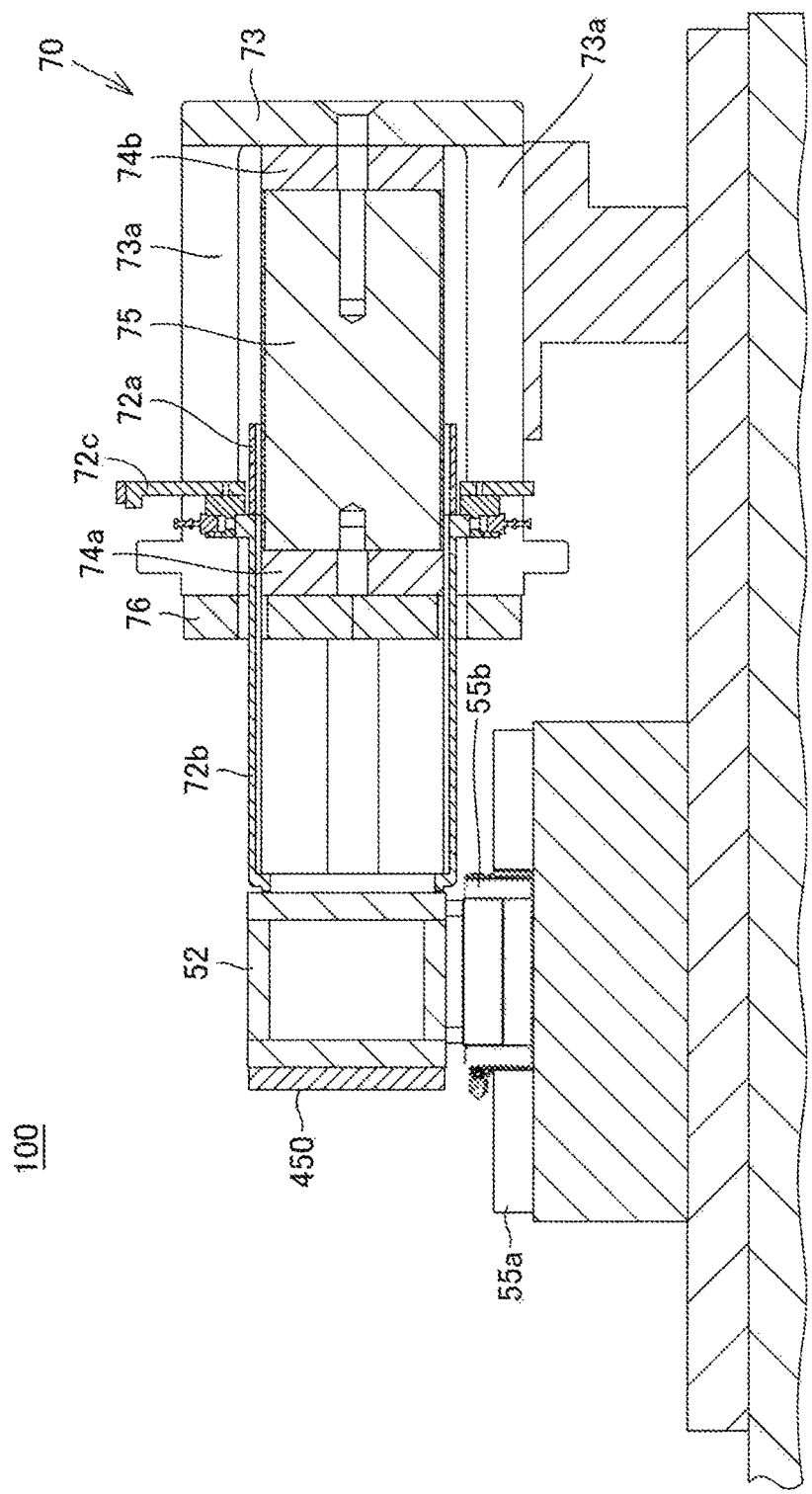
FIG. 2 is a cross-sectional view showing a configuration of the driving part according to the embodiment.
Figure 3:
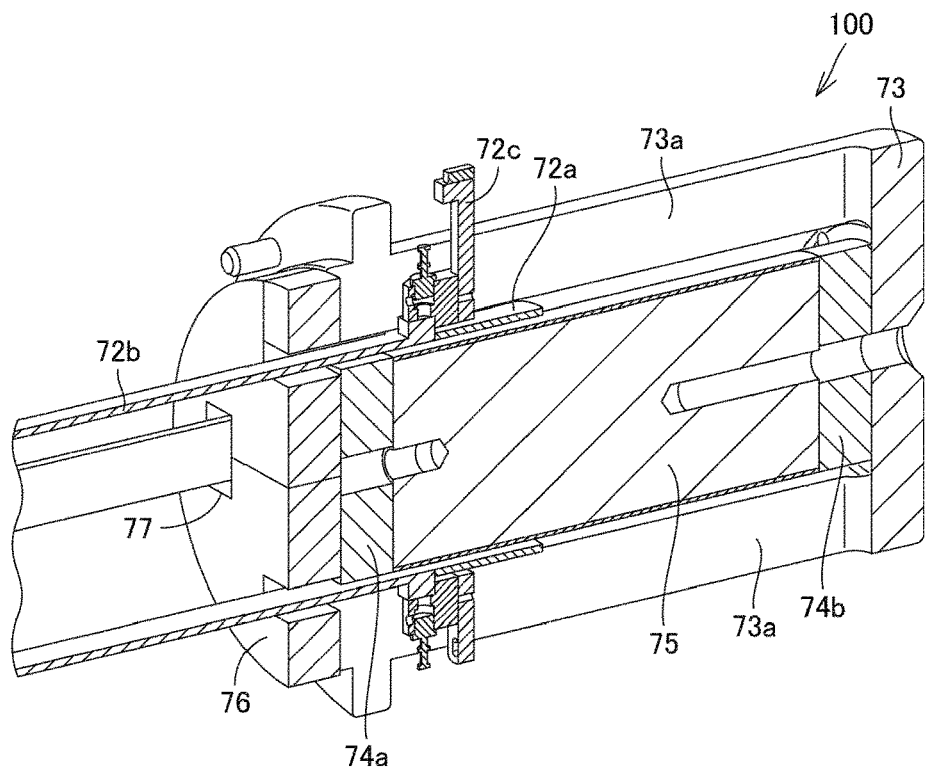
FIG. 3 is a cross-sectional perspective view showing the configuration of the driving part according to the embodiment.

In the FTIR, by maintaining a constant moving speed of the moving mirror 450, it is possible to obtain a spectrum with high reproducibility. Further, in the FTIR, by expanding a range of moving the moving mirror 450, it is possible to achieve highly accurate measurements. In this embodiment, a VCM is used in the driving part 100 which moves the moving mirror 450. FIG. 2 is a cross-sectional view showing a configuration of the driving part 100 according to the embodiment. FIG. 3 is a cross-sectional perspective view showing the configuration of the driving part 100 according to the embodiment.

The driving part 100 includes a cylindrical part 52 on one surface of which the moving mirror 450 is fixed, and a VCM 1 connected at a surface (another surface) of the cylindrical part 52 opposite to the surface on which the moving mirror 450 is fixed. The VCM 1 moves the position of the moving mirror 450 by reciprocating the cylindrical part 52. The moving mirror 450 is fixed to a tip (left side in FIG. 2) of the cylindrical part 52, and the cylindrical part 52 and the moving mirror 450 are supported by a linear motion mechanism to undergo reciprocation. The linear motion mechanism is, for example, a linear guide in which a guide 55b supporting the cylindrical part 52 undergoes a linear motion on a rail 55a. However, the linear motion mechanism is not limited to a linear guide in which the guide 55b is contact-supported on the rail 55a, but may also be configured such that the guide is supported on the rail in a non-contact manner such as magnetic levitation or air bearings.

The VCM 1 includes a fixing part 73 in a cylindrical shape corresponding to an outer yoke, and a yoke 75 in a cylindrical shape corresponding to an inner yoke and fixed to a bottom surface of the fixing part 73. The fixing part 73 and the yoke 75 are made of iron (made of magnetic material), and the fixing part 73 encloses the yoke 75 such that a central axis of the fixing part 73 coincides with a central axis of the yoke 75. Magnets 74a and 74b are provided at two ends of the yoke 75 in a central axis direction (left-right direction in the figure). Thus, the yoke 75 is fixed to the bottom surface of the fixing part 73 with the magnet 74b interposed therebetween. In other words, the magnet 74a, the yoke 75, and the magnet 74b are fixed to the bottom surface of the fixing part 73 in a sequence of the magnet 74a, the yoke 75, and the magnet 74b. On the other hand, a lid part 76 is provided at an opening surface of the fixing part 73 opposed to the bottom surface.

In the VCM 1, magnets are provided at two ends of the yoke 75, and two magnets are used. Thus, compared to a VCM in which a magnet is provided at one end of the yoke 75 and one magnet is used, in the VCM 1, the thrust of a moving part can be increased. In other words, in the VCM 1, by increasing a magnetic flux density in the fixing part 73, the thrust of the moving part can be increased and uniformity of the magnetic field can be ensured to expand the range of moving the moving part (lengthen a stroke). Although the magnet 74a and the magnet 74b are the same magnet, their shapes may also be different as long as their magnetic forces are the same.

Further, in the VCM 1, a magnetic flux leaking from the opening surface of the fixing part 73 is confined by the lid part 76 formed of a material with higher magnetic permeability than air. Thus, in the VCM 1, it is possible to suppress a decrease in the magnetic field on the opening surface side of the fixing part 73 and ensure uniformity of the magnetic field up to the opening surface side to expand the range of moving the moving part (lengthen a stroke).

The VCM 1 is provided with a moving part 72a, on which a coil in a cylindrical shape is fixed, between the yoke 75 and the fixing part 73. A support part 72b for connecting with the cylindrical part 52 is provided at one end of the moving part 72a. Four support parts 72b are provided through windows 77 provided at the lid part 76. The moving part 72a and the four support parts 72b may be integrally formed as a bobbin for winding a coil wire. Of course, the four support parts 72b may also be formed to be connected afterwards to the moving part 72a around which a coil wire has been wound.

A slit 73a in a long hole shape extending in the central axis direction is formed at a lateral surface of the fixing part 73. The slit 73a is symmetrically formed with respect to the central axis and is formed in an up-down direction with the central axis interposed therebetween in FIG. 2. The moving part 72a includes, on an outer peripheral surface, an annular-shaped coil wound with a wire, and the coil is electrically connected with a power source (not shown) via a power supply terminal (power supply line) 72c arranged to penetrate the slit 73a. Thus, in the VCM 1, upon passing a current through the coil of the moving part 72a via the power supply terminal 72c, the coil receives an electromagnetic force (Lorentz force) due to the magnetic field formed between the fixing part 73 and yoke 75 and moves in the central axis direction, which thereby reciprocates the moving mirror 450 fixed to the cylindrical part 52.

[Configuration of Lid Part]

Figure 4:
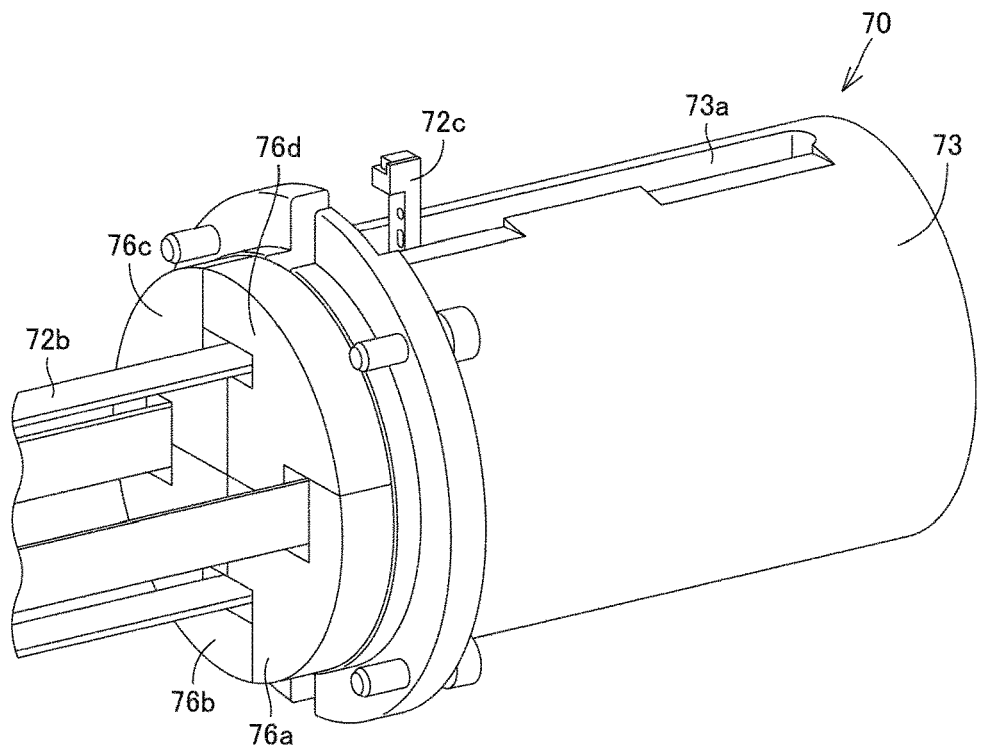
FIG. 4 is a perspective view showing the configuration of the driving part according to the embodiment.

A configuration of the lid part 76 will be described. FIG. 4 is a perspective view showing the configuration of the driving part according to the embodiment. As shown in FIG. 4, the lid part 76 is composed of four parts 76a to 76d. By combining the four parts 76a to 76d, four windows 77 are formed. The lid part 76 could not transmit the thrust of the moving part 72a to the cylindrical part 52 or the moving mirror 450 by simply covering the opening surface of the fixing part 73. Thus, in the VCM 1, the thrust of the moving part 72a is transmitted to the cylindrical part 52 and the moving mirror 450 by the four support parts 72b connected to the cylindrical part 52 and the moving mirror 450 through the windows 77.

It is also possible to extend one support part 72b from the central axis to transmit the thrust of the moving part 72a to the cylindrical part 52 and the moving mirror 450. However, in the case where the moving mirror 450 is connected to a tip of one support part 72b and the moving part 72a is reciprocated, with the mechanical rigidity of the moving mirror 450 decreasing and the resonance frequency decreasing, an oscillation phenomenon during high-speed driving occurs and driving at a constant speed cannot be performed. In the FTIR, it is necessary to reciprocate the moving mirror 450 uniformly to obtain high reproducibility, so it is necessary to transmit the thrust of the moving part 72a to the cylindrical part 52 or the moving mirror 450 by a plurality of support parts 72b.

In FIG. 4, four support parts 72b are symmetrically provided with respect to the central axis, and the support parts 72b extend in a straight line from the moving part 72a. By connecting the moving part 72a and the cylindrical part 52 with the four support parts 72b, it is possible to increase the natural frequency of the moving part 72a itself and uniformly reciprocate the moving mirror 450. Further, in the case of providing four windows 77 at the lid part 76 for passing the four support parts 72b, as shown in FIG. 4, the lid part 76 is divided into four parts 76a to 76d, and the four parts 76a to 76d are combined to form the four windows 77. Thus, by combining the four parts 76a to 76d to form the four windows 77, assemblability of the VCM 1 increases. Removal directions of the four parts 76a to 76d are respectively radial directions.

[Uniformity of Thrust]

Figure 5:
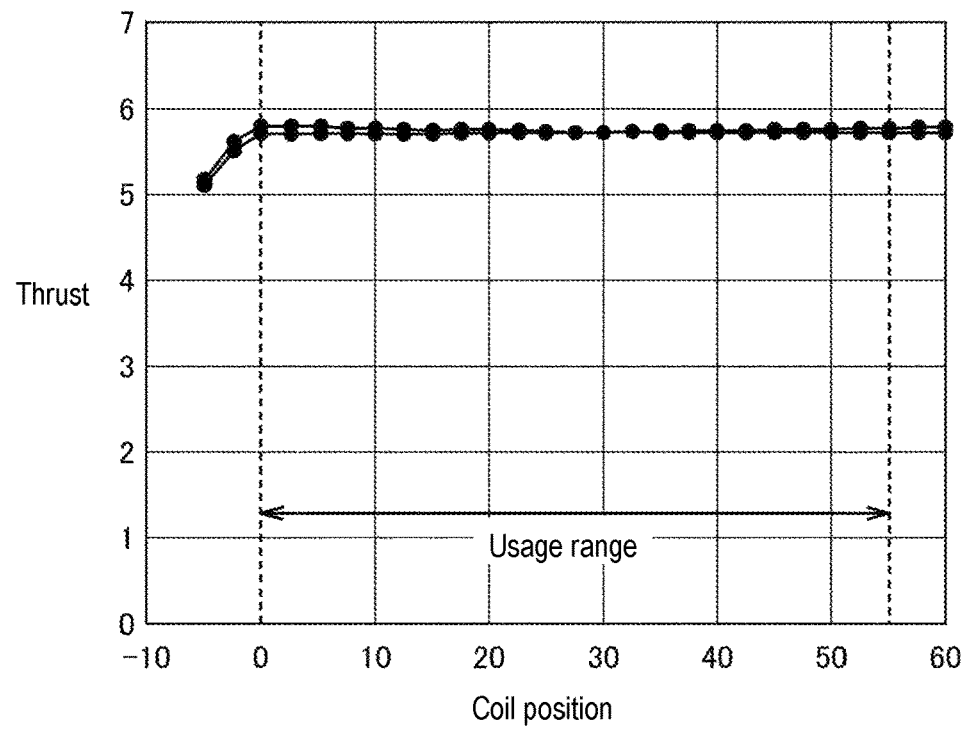
FIG. 5 is a graph showing a thrust of the driving part according to the embodiment.
Figure 6:
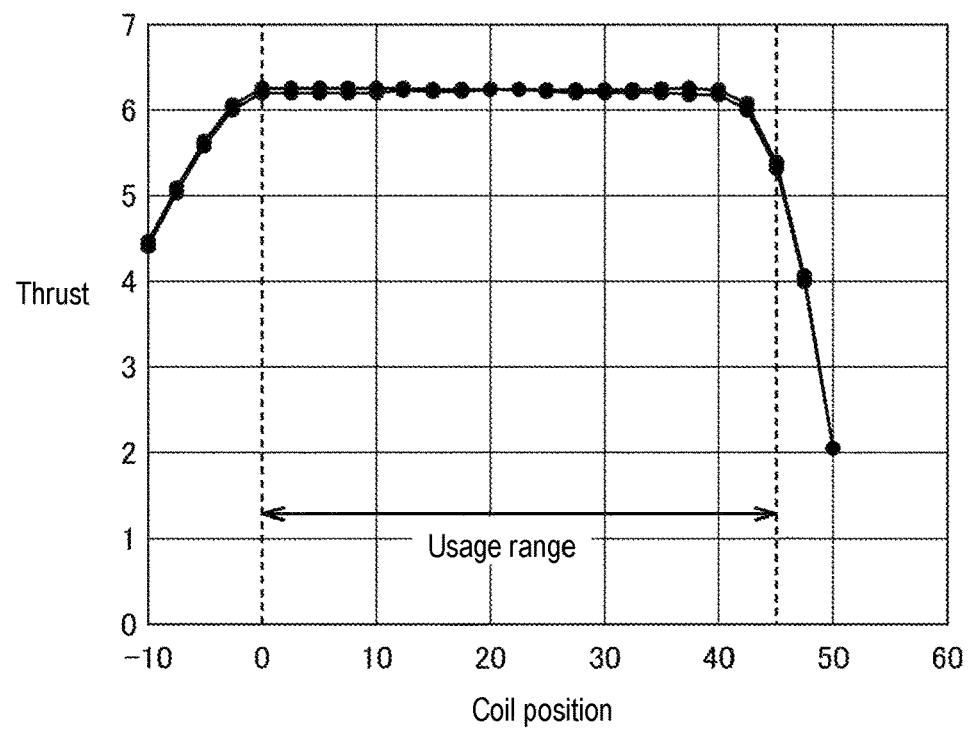
FIG. 6 is a graph showing a thrust of a driving part according to a comparative example.

Uniformity of the thrust of the driving part 100 will be described. FIG. 5 is a graph showing the thrust of the driving part 100 according to the embodiment. FIG. 6 is a graph showing the thrust of a driving part according to a comparative example. The driving part of the comparative example does not adopt the configuration of the VCM 1 included in the driving part 100 but has a configuration excluding the magnet 74a and the lid part 76 from the VCM 1 shown in FIG. 2.

FIG. 5 shows a change in the thrust at each position of the coil (moving part 72a), with the horizontal axis representing the coil position and the vertical axis representing the thrust. The values of the coil position and the thrust shown in FIG. 5 and FIG. 6 are shown in level values normalized as comparable values. In the driving part 100, as understood from FIG. 5, uniformity of the thrust is ensured from 0 level to 56 level of the coil position, and it is possible to ensure a usage range of moving the moving mirror 450.

On the other hand, FIG. 6 similarly shows a change in the thrust at each position of the coil (moving part), with the horizontal axis representing the coil position and the vertical axis representing the thrust. In the driving part of comparative example, as understood from FIG. 6, uniformity of the thrust is ensured from 0 level to 40 level of the coil position, and it is possible to ensure a usage range of moving the moving mirror. Thus, in the driving part 100, compared to the driving part of the comparative example, the usage range can be expanded by 16 levels, and the usage range is expanded by approximately 1.4 times. Further, in the driving part 100, while the usage range is expanded compared to the driving part of the comparative example, an equivalent thrust is still ensured.

FIG. 5 and FIG. 6 are graphs showing the change in the thrust at each position in the case where a current value is changed in a predetermined range to pass a current through the coil. As understood from FIG. 5 and FIG. 6, even if the current value flowing through the coil is changed in the predetermined range, a substantially same relationship between the coil position and the thrust can be obtained.

Figure 7:
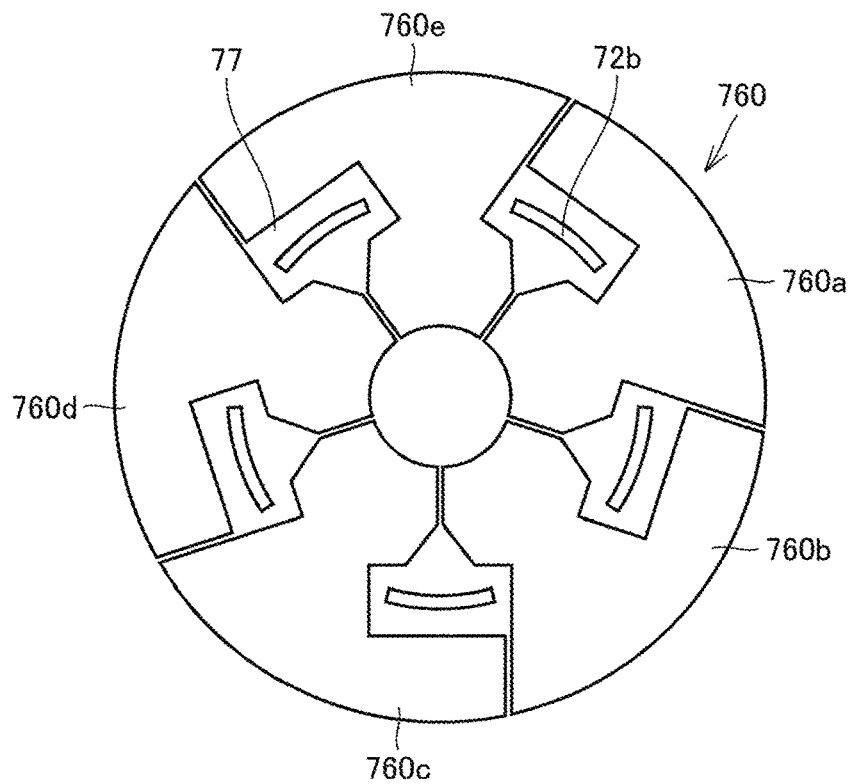
FIG. 7 is a view showing a configuration of a lid part according to a modification example.

Modification Examples (1) As described with reference to FIG. 4, the lid part 76 is composed of the four parts 76a to 76d. However, the embodiment is not limited thereto, and the lid part may also be composed of a plurality of parts in a quantity equal to the quantity of the windows. FIG. 7 is a view showing a configuration of a lid part according to a modification example. As shown in FIG. 7, a lid part 760 is composed of five parts 760a to 760e to provide five windows 77.

However, in the lid part, as the quantity of the divided parts increases, it becomes necessary to reduce the size (area) of each part to ensure assemblability. For example, in the case where the lid part is divided into five parts, the area of the lid part decreases by approximately 5% compared to the case of being divided into four parts. With the area of the lid part decreasing, leakage of the magnetic flux from the lid part increases and the thrust of the driving part decreases. In other words, there is a trade-off relationship between increasing the quantity of the support parts and the windows and the thrust of the driving part.

Since the plurality of parts divided from the lid part are attracted with the magnet, the work of forming the lid part by combining the plurality of parts or dividing the lid into the plurality of parts is difficult. Thus, it is preferable that the plurality of parts have a shape capable of being respectively pulled out in the radial directions of the lid part.

Figure 8:
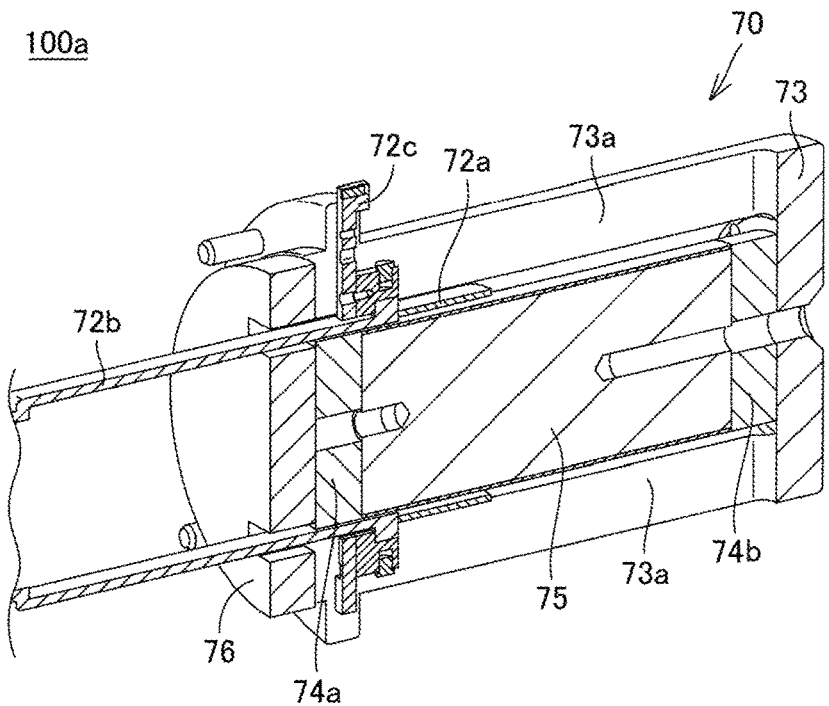
FIG. 8 is a cross-sectional perspective view showing a configuration of a driving part according to a modification example.

(2) In the driving part 100 described with reference to FIG. 2, the cylindrical part 52 and the moving mirror 450 are configured to be supported by the four support parts 72b. However, the embodiment is not limited thereto, and the quantity of the support parts 72b supporting the cylindrical part 52 and the moving mirror 450 may be two or more. FIG. 8 is a cross-sectional perspective view showing a configuration of a driving part according to a modification example. Configurations of a driving part 100a shown in FIG. 8 that are the same as the configurations of the driving part 100 shown in FIG. 2 will be labeled with the same reference signs, and detailed descriptions thereof will not be repeated.

The driving part 100a does not support the cylindrical part 52 and the moving mirror 450 by four support parts 72b, but supports the cylindrical part 52 and the moving mirror 450 by two support parts 72b. In FIG. 8, the two support parts 72b are provided symmetrically with respect to the central axis, and the support parts 72b extend in a straight line from the moving part 72*a*. In the case of connecting the moving part 72*a* and the cylindrical part 52 by two support parts 72*b*, the natural frequency of the moving part 72*a* itself decreases compared to the case of connecting the moving part 72*a* and the cylindrical part 52 by four support parts 72*b*. However, since the natural frequency of the moving part 72*a* itself increases compared to the case of connecting the moving part 72*a* and the cylindrical part 52 by one support part 72*b*, the driving part 100*a* can reciprocate the moving mirror 450 uniformly.

In the driving part 100*a*, the oscillation in directions in which the two support parts 72*b* are not provided increases. Thus, to reduce such oscillation, it is preferable for the driving part to support the cylindrical part 52 and the moving mirror 450 by three support parts 72*b*.

Further, in the case of providing two windows 77 at the lid part 76 for passing the two support parts 72*b*, as shown in FIG. 8, the lid part 76 is divided into two parts, and the two parts are combined to form two windows 77. Thus, by combining the two parts to form the two windows 77, assemblability of the driving part 100*a* increases.

[Aspects]

It will be understood by those skilled in the art that the plurality of exemplary embodiments described above are specific examples of the aspects below.

(Item 1) An analysis device according to an aspect includes: a moving mirror (450), a position of the moving mirror being movable; and a driving part (100, 100*a*) which moves the position of the moving mirror (450). The driving part (100, 100*a*) is a driving part which moves the position of the moving mirror (450), and includes: a cylindrical part (52) on one surface of which a mirror is fixed; and a voice coil motor (70) which is connected at another surface of the cylindrical part and reciprocates the cylindrical part. The voice coil motor includes: a yoke (75) in a cylindrical shape; magnets (74*a*, 74*b*) provided at two ends of the yoke; a fixing part (73) which is in a cylindrical shape enclosing the yoke and fixes, at a bottom surface, the yoke provided with the magnets; a lid part (76) which is provided with a plurality of windows (77) and covers an opening surface of the fixing part; a moving part (72*a*) which is arranged between the yoke and the fixing part and on which a coil in a cylindrical shape is fixed; and a plurality of support parts (72*b*) each including one end fixed to the moving part and another end connected at the another surface of the cylindrical part through the window.

According to the driving part described in Item 1, since the lid part is provided at the opening surface of the fixing part, and the cylindrical part on which the mirror is fixed is supported by the support parts provided through the windows of the lid part, it is possible to reciprocate the moving part in a wider range without an increase in size. Further, according to the analysis device described in Item 1, since the mirror can be reciprocated in a wider range, it is possible to achieve measurements with high wavenumber resolution.

(Item 2) According to the analysis device described in Item 1, the lid part is composed of a plurality of parts (76*a* to 76*d*, 760*a* to 760*e*), and the windows are formed by combining the plurality of parts.

According to the analysis device described in Item 2, since the lid part is composed of a plurality of parts, it is possible to increase assemblability of the voice coil motor.

(Item 3) According to the analysis device described in Item 2, the lid part is composed of the plurality of parts in a quantity equal to a quantity of the windows.

According to the analysis device described in Item 3, by including the plurality of parts in a quantity equal to the quantity of the windows, it is possible to suppress an increase in the quantity of the parts more than necessary, suppress a decrease in the area of the lid part, and suppress a decrease in the thrust of the driving part.

(Item 4) According to the analysis device described in any one of Items 1 to 3, the plurality of support parts are at least three or more support parts.

According to the analysis device described in Item 4, since the plurality of support parts are at least three or more support parts, it is possible to ensure high mechanical rigidity of the moving part and uniformly reciprocate the moving part.

(Item 5) According to the analysis device described in any one of Items 1 to 4, the magnet provided at one end of the yoke and the magnet provided at another end have a same magnetic force.

According to the analysis device described in Item 5, by using magnets having the same magnetic force, uniformity of the magnetic flux density in the fixing part 73 increases.

The embodiments disclosed herein should be considered as illustrative in all respects rather than restrictive. The scope of the present invention is not limited to the description of the above embodiments but is indicated by the claims, and all modifications within the meaning and range equivalent to the claims are intended to be included in the scope of the present invention.

The invention claimed is:

1. An analysis device comprising:
   a moving mirror, a position of the moving mirror being movable; and
   a driving part which moves the position of the moving mirror, wherein
   the driving part comprises:
      a cylindrical part on one surface of which the moving mirror is fixed; and
      a voice coil motor which is connected at another surface of the cylindrical part and reciprocates the cylindrical part, and
   the voice coil motor comprises:
      a yoke in a cylindrical shape;
      magnets provided at two ends of the yoke;
      a fixing part which is in a cylindrical shape enclosing the yoke and fixes, at a bottom surface, the yoke provided with the magnets;
      a lid part which is provided with a plurality of windows and covers an opening surface of the fixing part;
      a moving part which is arranged between the yoke and the fixing part and on which a coil in a cylindrical shape is fixed; and
      a plurality of support parts each comprising one end fixed to the moving part and another end connected at the another surface of the cylindrical part through the window.

2. The analysis device according to claim 1, wherein the lid part is composed of a plurality of parts, and the windows are formed by combining the plurality of parts.

3. The analysis device according to claim 2, wherein the lid part is composed of the plurality of parts in a quantity equal to a quantity of the windows.

4. The analysis device according to claim 1, wherein the plurality of support parts are at least three or more support parts.

5. The analysis device according to claim 1, wherein the magnet provided at one end of the yoke and the magnet provided at another end have a same magnetic force.

* * * * *